May 23, 1961     A. H. KUHLMAN, JR     2,985,217
TUBELESS TIRE
Filed Nov. 9, 1955
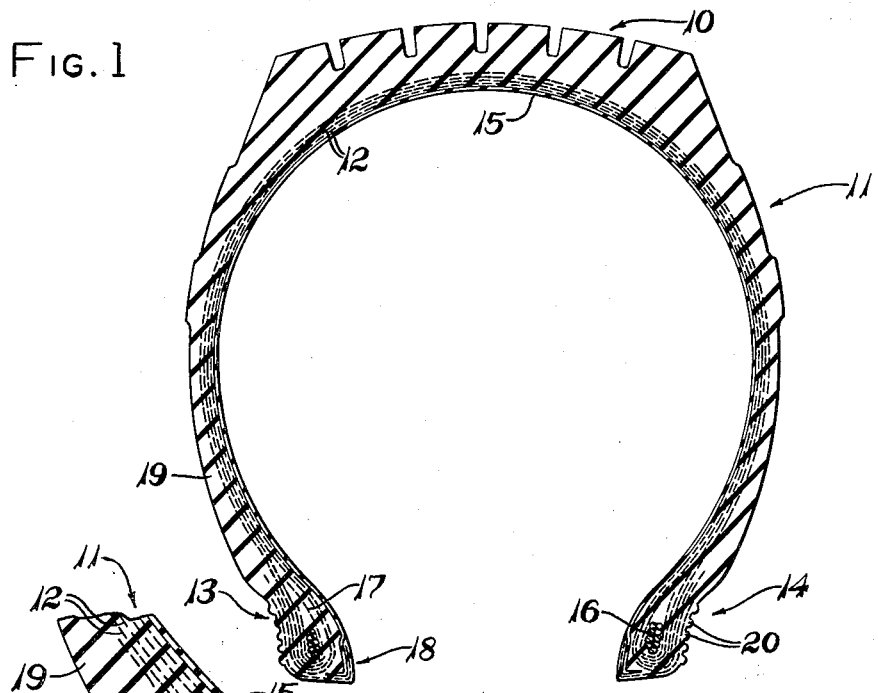
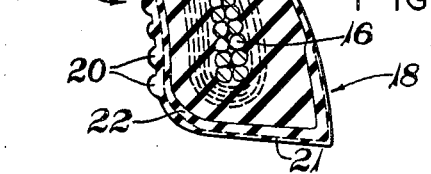
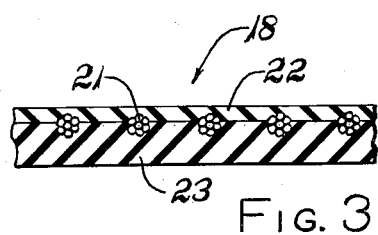
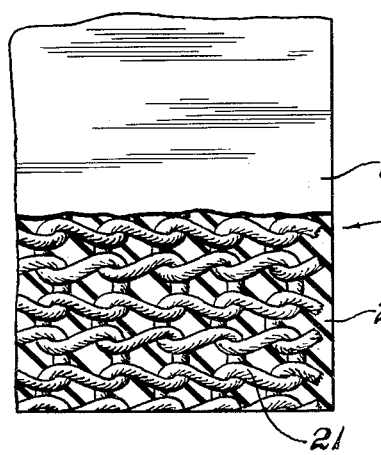
INVENTOR.
ARTHUR H. KUHLMAN JR
BY
ATTY.

United States Patent Office 2,985,217
Patented May 23, 1961

2,985,217
TUBELESS TIRE
Arthur H. Kuhlman, Jr., Cuyahoga Falls, Ohio, assignor to The B. F. Goodrich Company, New York, N.Y., a corporation of New York
Filed Nov. 9, 1955, Ser. No. 545,851
11 Claims. (Cl. 152—362)

This invention relates to inflatable tubeless tires and, more particularly, to an improved construction for the chafers or finishing strips of such tires.

An inflatable tire of the tubeless type utilizes the tire and the wheel rim on which it is mounted as the chamber for the inflation fluid, which is generally air. In such an assembly, the bead regions of the tire must form a fluid-tight seal with the rim and the interior of the carcass must be sufficiently impervious to the inflation fluid to prevent appreciable loss of the latter. Consequently, the interior of the tire carcass is preferably provided with a lining or layer of substantially impervious elastomeric material and the outer surfaces of the tire beads have an abrasion resistant elastomeric covering in which are formed circumferentially extended ribs or projections that provide a sealing engagement with the side flanges of the rim on which the tire is mounted. The bead regions of a tire are, however, subjected to a certain amount of stress and/or chafing due to flexing of the tire in negotiating corners, curves and irregularities in the roadway so that it is customary to provide these regions of the tire with a chafing or finishing strip which is a relatively narrow strip of fabric formed of twisted multiple filament cords interconnected in a square or leno weave.

In conventional tire constructions the chafer or finishing strips extend exteriorly of the carcass plies from a location within the air containing chamber provided by the tire and rim across the bead bases and radially of the tire carcass to locations above the rim flanges. The strips are dipped or coated with sufficient elastomeric material to cover the surface thereof but the fabric is quite close to the outer surface of the tire bead and hence portions of the fabric are frequently exposed either during curing or during subsequent mounting or use of the tire. Such exposure of the cords of the finishing strips provides a passage for the air or other inflation fluid along the exposed cords or through the interstices thereof, the fluid either being lost to the atmosphere or entering into the body of the tire carcass where ply separation or related defects may be produced.

In an effort to eliminate the above mentioned difficulties encountered wtih conventional chafer or finishing strips, tubeless tires have been constructed in which such such strips are omitted. This omission, however, undesirably reduces the strength and flex resistance of the tire beads. Moreover, since the elastomeric materials of the bead regions become somewhat fluid during the molding and curing operation, there is a tendency for the ends of the reinforcing plies of the carcass, which are turned about the bead cores, to shift. This further weakens the beads and may even cause some of the ply cord ends to pull through the elastomeric material or so close to the surface that there is exposure to the inflation fluid in the tire thereby causing loss of pressure and/or premature tire failures due to ply separation, tread separation or other related causes.

The principal object of this invention is, therefore, to provide an improved tubeless tire construction wherein chafer or finishing strips are provided by a fabric which has no components thereof extending continuously from edge to edge thereof, whereby strengthening of the tire beads and proper retention of the ends of the carcass plies are achieved without sacrifice of the imperviousness of this portion of the tire to the inflation fluid contained therein.

A more specific object of the invention is to provide an improved tubeless tire wherein the beads thereof are provided with chafer or finishing strips of knitted fabric, the loops of the yarns of which are so positioned that no continuous length of yarn in a strip extends transversely thereof from edge to edge of the strip, whereby exposure of a portion of the fabric to the inflation fluid does not provide a path for passage of that fluid from the inflation chamber.

A still more specific object of the invention is to provide an improved tubeless tire wherein the tire beads are each provided with a finishing strip of knitted fabric, the yarns of which are formed of multifilament twisted fibers, with the yarn loops extending transversely of the beads, and provided with an elastomeric covering united with the elastomeric material of the tire carcass.

The invention further resides in certain novel features of construction of the tire in which the invention is embodied, and further objects and advantages thereof will be apparent to those skilled in the art to which the invention pertains from the following description of the presently preferred embodiment, taken in conjunction with the accompanying drawings, forming a part of this application, and in which:

Fig. 1 is a fragmentary transverse sectional view through an inflatable tubeless tire constructed in accordance with this invention;

Fig. 2 is an enlarged fragmentary sectional view of one bead of the tire shown in Fig. 1, more clearly illustrating the construction thereof;

Fig. 3 is an enlarged fragmentary transverse sectional view through a finishing strip employed in constructing the tire illustrated in Fig. 1; and Fig. 4 is an enlarged plan view of the portion of the strip shown in Fig. 3 with a part of the elastomeric covering removed to more clearly show the nature of the knitted fabric reinforcement thereof.

Referring first to Fig. 1 of the drawing, the inflatable vehicle tire illustrated therein includes a tread portion 10 surrounding an annular inner carcass 11 of resilient elastomeric material, such as natural or synthetic rubber, and reinforcing cords, the latter being disposed in superposed plies 12. The inner periphery of the tire is defined by spaced bead portions 13 and 14 which are adapted to fit on the rim of a vehicle tire and cooperate therewith to provide a chamber for the inflation fluid without the need of a separate tube or container. Therefore, the interior of the tire carcass is preferably provided with a layer or lining 15 of an impervious elastomeric material such as the isoolefin-diolefin copolymer commonly known as butyl rubber.

The bead regions 13 and 14 of the tire are identical and each is formed by turning the edges of the cord plies 12 successively about a circumferentially extending bead core, such as 16, which may be formed by a bundle of wires suitably wrapped and provided with a flipper strip 17, the ends of which extend radially of the side wall of the tire. Extending externally over the turned ends or edges of the reinforcing cord plies 12 in each bead is a chafer or finishing strip 18. These strips are relatively narrow and extend transversely of the tire beads with the inner edge of each strip positioned within the interior of the tire carcass just above the bead toe. The strips extend across the bead bases and radially of the side walls a short distance to positions therein above the outer edges of the flanges of the tire rim on which the tire is adapted to be mounted. The finishing strips 18 are provided with elastomeric materials so that during curing of the tire they unite with the elastomeric materials of the inner layer or liner 15 and with the outer covering or side wall rubber 19. Also during the curing and molding operations of the tire the outer side surfaces of the beads are provided with circumferentially extending sealing ribs or projections 20.

Tires constructed in this manner and having the cords of the chafer or finishing strips 18 formed of a plurality of filaments twisted together provide good strength and flex resistance. However, when the fabric of the strips 18 has the cords thereof arranged in a weftless or woven form, such as square woven or leno weave of the types normally employed for chafer fabrics, difficulties are frequently encountered because any exposure of a portion of a cord in such fabric allows passage of the inflation fluid along the cord or between the individual filaments thereof. This passage of fluid, known as wicking, results in loss of inflation pressure when the cord communicates both with the interior of the tire and the atmosphere. A more serious condition, however, occurs when the inflation fluid thus permeating a cord or cords of the finishing strip cannot vent externally of the tire since such fluid then forms a pocket or pockets within the body of the tire producing ply and/or tread separation which are highly detrimental to the life of the tire.

Attempts to remedy wicking of fabrics utilized as chafer or finishing strips by merely providing thicker layers of rubber or other elastomeric material upon the conventional square woven or leno weave fabric have been unsuccessful since, as mentioned heretofore, the elastomeric material is substantially fluid during curing of the tires so that the cords of the fabric can still become exposed during molding or move so close to the surface that there is exposure of a portion of the cords after only relatively minor chafing or flexing of the beads. Weaving the finishing strip fabric from monofilaments eliminates the possibility of wicking through the filaments but not along the exterior thereof which may occur when the bonding of the elastomeric covering to the fabric is not complete. Moreover, monofilament fabric does not possess the optimum flex and other characteristics desired in a finishing strip.

In accordance with this invention, the advantages of employing a chafer or finishing strip formed of multifilament yarns or cords are retained, while the difficulties of fluid wicking therealong or therethrough are eliminated by employing in such strips a knitted fabric in which the component portions are interconnected loops extending generally transversely of the length of the strip in a manner such that no continuous length of a component of the strip extends from side to side thereof.

Referring now to Figs. 3 and 4 of the drawing, it will be seen that the improved chafer or finishing strip of this invention comprises a fabric 21 knitted from yarns formed of twisted multifilament fibers with the strip so arranged that the loops of the yarns are disposed transversely of the length thereof. This may be accomplished for example, by cutting lengths of knit fabric into strips of the desired width, the cutting being effected transversely of the side portions of the loops of the yarns therein; for example, parallel to the side edges of the fabric shown in Fig. 4. When a strip of this nature is incorporated into the bead region of a tire it will be seen that no continuous portion of a length of yarn of the strip extends entirely transversely of the bead. Hence, if a portion of such a fabric be exposed to the inflation fluid contained in the tire, such fluid cannot travel an appreciable distance along the yarn. Therefore, the inflation fluid can neither be vented to the atmosphere nor into the side wall of the tire beneath the elastomeric cover thereof.

The knit fabric 21 is provided with elastomeric material before incorporation into a tire bead to facilitate adhesion to and unison with the liner, sidewall cover and carcass of the tire. This elastomeric material may be applied by dipping the fabric into latex, liquid cement, or other solution or dispersion of an elastomer or may be provided by calendering or coating the elastomer on the fabric by any known procedure. The filaments forming the yarn or cord of the fabric may be cotton, rayon, nylon or other natural or synthetic fibers having suitable flex resistance and tensile strength or may be filaments of inorganic substances such as wire. Preferably, the fabric should be treated with a suitable adhesive substance or substances prior to or simultaneous with the application of the elastomeric material thereto as is well-known in the art.

In the presently preferred construction, the fabric 21 is formed of yarns of continuous filament synthetic fibers twisted together and then knit in a manner such that the fabric can be severed into strips with no yarn or cord extending transversely from edge to edge thereof. The fabric is dipped into an adhesion promoting substance such as resorcinol formaldehyde latex or other known substances after which one surface has a layer 22 of an elastomer with high fluid imperviousness calendered thereon, which layer may be an isoolefin-diolefin copolymer such as that commonly known as butyl rubber. The other side of the fabric 21 is then provided with a layer 23 of a different elastomer such as natural rubber, GRS, or other of the synthetic rubbers which has good abrasion resistance and is the same as, or compatible with, the elastomer of the sidewall covering 19.

A strip of this nature is applied to each bead of the tire during the building operation in the same manner that conventional chafer or finishing strips are utilized. The side of the strip provided with the layer 22 is placed innermost so that the highly impervious elastomer 22 thereof is in contact with the highly impervious liner 15 of the tire. The outer layer 23 of this strip therefore forms the base of the tire bead while the outer edge of the strip extends outwardly and around the bead and is joined with the inner edge portion of the side wall covering 19. The tire thus constructed is then placed in a suitable mold and subjected to heat and pressure in the conventional manner so that the elastomers of the chafer or finishing strip are united with the elastomers of the tire carcass, the liner, and the side walls thereof. During this operation the elastomer on the outer surfaces of the tire beads flows into suitable configurations of the mold thereby forming the sealing ribs 20. A tire thus constructed may be mounted and used in the same manner as other tubeless tires but has improved characteristics in that there can be no fluid wicking through the bead regions even though a portion or portions of the fabric in the finishing strip be exposed to the inflation fluid since there is no continuous path for the fluid transversely through the fabric.

The preferred embodiment of the invention has been described in conjunction with an illustration of but one specific form of knit fabric. It will be apparent however, that other knit fabrics may be employed provided that they do not have a yarn or yarns thereof extending continuously transversely of the strip. Moreover, when a reference has been made herein to the components of the strip as being yarns this term is intended to be considered in the generic sense in that the fabric 21 may be knit from multiple strands or cords as well as from single yarns. These and other equivalents and adaptions of the materials wherein specifically set forth are considered as encompassed within the ambit of this invention which is not limited except as may be required by the spirit and scope of the appended claims.

Having thus described the invention, I claim:

1. In a tubeless tire having spaced circumferentially extending beads, a finishing strip incorporating in each of said beads with each strip extending laterally of a bead base and outwardly therefrom to a region in the outer sidewall of the tire, the said strips each comprising knitted yarn fabric positioned so that no continuous length of yarn extends transversely of a strip from edge to edge thereof.

2. In an inflatable tubeless tire having spaced circumferentially extending beads, a non-wicking chafer or finishing strip incorporated in each bead comprising a knitted yarn fabric with the loops of the yarns thereof extending transversely of the circumference of the bead so that no continuous length of yarn extends transversely of a strip from edge to edge thereof, whereby inflation fluid entering the end of a yarn portion at the inner edge of the strip cannot pass lengthwise of that yarn portion to the other edge of the strip.

3. In a tubeless tire having spaced circumferentially extending beads, a fabric strip incorporated in each of said beads with each strip extending circumferentially of a bead laterally across a bead base and outwardly therefrom to a region in the outer sidewall of the tire, the said strips each comprising knitted multifilament yarns with the loops thereof positioned so that no continuous length of yarn extends transversely of a strip from edge to edge thereof.

4. In a tubeless tire having an impervious elastomeric lining and spaced circumferentially extending beads, a finishing strip incorporated in each of said beads with each strip extending across a bead base and outwardly therefrom to a region in the outer sidewall of the tire, the said strips each comprising knitted multifilament yarn with the loops thereof positioned so that no continuous length of yarn extends transversely of a strip from edge to edge thereof, and an elastomeric material on each strip united with the said lining.

5. In a tubeless tire having an air impervious elastomeric lining and spaced circumferentially extending beads, a non-wicking chafer or finishing strip incorporated in each bead comprising a knitted yarn fabric with the loops of the yarns thereof extending transversely of the circumference of the bead so that no continuous length of yarn extends transversely of a strip from edge to edge thereof, an air impervious elastomeric material on the inner face of each of said strips united with said liner, and a different elastomeric material on the outer surface of said strip united with the material comprising the outer surface of the tire.

6. A tubeless tire comprising a cord reinforced elastomeric carcass having spaced circumferentially extending beads provided with bead cores about which the ends of the cord reinforcements are turned, and a fabric reinforced strip incorporated in each bead in a location disposed outwardly of the cord reinforcements and extending across the base of each bead and radially of the outer sides thereof a limited distance beyond the bead bases, the fabric in each of said strips being composed of knitted yarn with the loops thereof extending transversely of the tire beads and having no longitudinally continuous portion of yarn extending from one edge of the fabric to the other.

7. A tubeless tire comprising a cord reinforced elastomeric carcass having spaced circumferentially extending beads provided with bead cores about which the ends of the cord reinforcements are turned, and a fabric reinforced strip incorporated in each head in a location disposed outwardly of the cord reinforcements and extending across the base of each bead and radially of the outer sides thereof a limited distance beyond the bead bases, the fabric in each of said strips being composed of knitted multifilament yarn with the loops thereof extending transversely of the tire beads and having no longitudinally continuous portion of yarn extending from one edge of the fabric to the other, the said strips also including a covering of elastomeric material united with the elastomeric carcass.

8. A tubeless tire comprising a hollow annular body of resilient elastomeric material open at the radial inner portion and having wheel-engaging bead portions at the inner periphery, circumferentially extending bead cores disposed in the bead portions, reinforcing cord plies embeded in said annular body and extending from bead portion to bead portion with the edges of the plies turned around said bead cores, a strip of textile material embedded in each of said bead portions outwardly of said reinforcing plies with each of said strips extending beyond the wheel-engaging area of the bead portion in which it is embedded a limited distance radially of the outer side of that region, the said strips consisting of knitted yarn such that no continuous length of yarn extends transversely of a strip from edge to edge thereof.

9. A tubeless tire comprising a hollow annular body of resilient elastomeric material open at the radial inner portion and having wheel-engaging bead portions at the inner periphery, circumferentially extending bead cores disposed in the bead portions, reinforcing cord plies embedded in said annular body and extending from bead portion to bead portion with the edges of the plies turned around said bead cores, a strip of textile material embedded in each of said bead portions outwardly of said reinforcing plies with each of said strips extending beyond the wheel-engaging area of the bead portion in which it is embedded a limited distance radially of the outer side of that region, the said strips consisting of knitted multifilament textile yarn with the loops thereof extending transversely relative to the circumference of the bead portions of the tire and having no longitudinally continuous portion of yarn extending from one edge of the strip to the other.

10. A tubeless tire comprising a hollow annular body of resilient elastomeric material open at the radial inner portion and having wheel-engaging bead portions at the inner periphery, circumferentially extending bead cores disposed in the bead portions, reinforcing cord plies embedded in said annular body and extending from bead portion to bead portion with the edges of the plies turned around said bead cores, a finishing strip in each of said bead portions outwardly of said reinforcing plies with each of said strips extending beyond the wheel-engaging area of the bead portion in which it is embedded a limited distance radially of the outer side of that region, the said strips comprising a knitted textile fabric formed from multifilament yarn with the loops thereof extending transversely relative to the circumference of the bead portions of the tire and having no longitudinally continuous portion of yarn extending from one edge of a strip to the other, and a layer of elastomeric material on either surface of the fabric of said strips united with the elastomeric material of the carcass.

11. In a tubeless tire having spaced circumferentially extending beads, a finishing strip incorporated in each of said beads with each strip extending laterally of a bead base and outwardly therefrom to a region in the outer sidewall of the tire, the said strips each comprising a fabric formed of generally circumferentially extending components with adjacent components interengaged at spaced locations therealong and having no continuous length of a component extending transversely of a strip from edge to edge thereof.

References Cited in the file of this patent

UNITED STATES PATENTS

| | | |
|---|---|---|
| 1,141,697 | Deslauriers | June 1, 1915 |
| 2,131,636 | Nellen | Sept. 27, 1938 |
| 2,563,787 | Keefe | Aug. 7, 1951 |

UNITED STATES PATENT OFFICE
CERTIFICATE OF CORRECTION

Patent No. 2,985,217                                      May 23, 1961

Arthur H. Kuhlman, Jr.

It is hereby certified that error appears in the above numbered patent requiring correction and that the said Letters Patent should read as corrected below.

Column 5, line 64, for "head" read -- bead --.

Signed and sealed this 17th day of April 1962.

(SEAL)
Attest:

ESTON G. JOHNSON                                  DAVID L. LADD

Attesting Officer                                      Commissioner of Patents